(12) United States Patent
Amegadzie et al.

(10) Patent No.: US 9,110,920 B1
(45) Date of Patent: Aug. 18, 2015

(54) CIFS ACCESS TO NFS FILES AND DIRECTORIES BY TRANSLATING NFS FILE HANDLES INTO PSEUDO-PATHNAMES

(75) Inventors: Augustine Amegadzie, Warren, NJ (US); Frank S. Caccavale, Hopedale, MA (US); Xiaoye Jiang, Shrewsbury, MA (US); Ka-Lai Wei, South Plainfield, NJ (US)

(73) Assignee: EMC Corporation, Hopkinton, MA (US)

( * ) Notice: Subject to any disclaimer, the term of this patent is extended or adjusted under 35 U.S.C. 154(b) by 2602 days.

(21) Appl. No.: 11/744,200

(22) Filed: May 3, 2007

(51) Int. Cl.
*G06F 17/30* (2006.01)

(52) U.S. Cl.
CPC .... *G06F 17/30238* (2013.01); *G06F 17/30091* (2013.01); *G06F 17/30203* (2013.01)

(58) Field of Classification Search
USPC ......... 709/212–213, 217–219, 203, 239, 249, 709/200; 707/821, 827, 831, 899; 711/202, 711/206, 217
See application file for complete search history.

(56) References Cited

U.S. PATENT DOCUMENTS

| | | | |
|---|---|---|---|
| 5,864,852 A * | 1/1999 | Luotonen | 726/14 |
| 5,893,140 A | 4/1999 | Vahalia et al. | |
| 6,078,929 A | 6/2000 | Rao | |
| 6,324,581 B1 * | 11/2001 | Xu et al. | 709/229 |
| 6,490,666 B1 | 12/2002 | Cabrera et al. | |
| 6,643,654 B1 * | 11/2003 | Patel et al. | 1/1 |
| 6,665,689 B2 | 12/2003 | Muhlestein | |
| 6,714,949 B1 | 3/2004 | Frey, Jr. | |
| 6,718,372 B1 * | 4/2004 | Bober | 709/217 |
| 6,775,679 B2 | 8/2004 | Gupta | |
| 6,985,914 B2 | 1/2006 | Venkatesh | |
| 7,055,014 B1 * | 5/2006 | Pawlowski et al. | 711/202 |
| 7,181,439 B1 * | 2/2007 | Lent et al. | 1/1 |
| 7,272,654 B1 * | 9/2007 | Brendel | 709/229 |
| 7,383,274 B2 * | 6/2008 | Pearce et al. | 1/1 |
| 7,606,868 B1 * | 10/2009 | Le et al. | 709/211 |
| 7,636,744 B1 * | 12/2009 | Aggarwal et al. | 1/1 |
| 7,668,881 B1 * | 2/2010 | Hoffmann et al. | 707/999.205 |
| 8,090,908 B1 * | 1/2012 | Bolen et al. | 711/114 |
| 8,161,133 B2 * | 4/2012 | Nakatani et al. | 709/219 |
| 2002/0065924 A1 * | 5/2002 | Barrall et al. | 709/227 |

(Continued)

OTHER PUBLICATIONS

Uresh Vahalia, Unix Internals: The New Frontiers, Chapter 9, "File System Implementations," and Chapter 11, Advanced File Systems, 1996, p. 261-289, 338-371, Prentice-Hall, Inc., Upper Saddle River, New Jersey.

(Continued)

*Primary Examiner* — Greg C Bengzon
(74) *Attorney, Agent, or Firm* — Deepika Bhayana; Jason A. Reyes; Krishnendu Gupta

(57) ABSTRACT

A file handle produced by a file server is encoded into a pseudo-pathname used as a substitute for a pathname in a network file access protocol for accessing a file in the file server. The method avoids repeating a directory lookup and may permit the network file access protocol to access a file that has been renamed since the file handle was produced. The method is particularly advantageous for enabling a file server to use a CIFS client for virus checking or backup of a file modified by an NFS client. In a preferred implementation, the encoding of the file handle into a pseudo-pathname involves converting the file handle to an ASCII hexadecimal format to produce a component name, and appending the component name to a special name of a pseudo-directory of file handles of files in a file system.

20 Claims, 11 Drawing Sheets

(56) References Cited

U.S. PATENT DOCUMENTS

| | | | | |
|---|---|---|---|---|
| 2002/0116593 | A1* | 8/2002 | Kazar et al. | 711/202 |
| 2002/0129277 | A1 | 9/2002 | Caccavale | |
| 2003/0009484 | A1 | 1/2003 | Hamanaka et al. | |
| 2003/0115218 | A1* | 6/2003 | Bobbitt et al. | 707/200 |
| 2003/0140051 | A1 | 7/2003 | Fujiwara et al. | |
| 2003/0220985 | A1* | 11/2003 | Kawamoto et al. | 709/219 |
| 2004/0030668 | A1 | 2/2004 | Pawlowski et al. | |
| 2004/0054748 | A1* | 3/2004 | Ackaouy et al. | 709/214 |
| 2004/0107222 | A1 | 6/2004 | Venkatesh et al. | |
| 2004/0254936 | A1 | 12/2004 | Mohamed | |
| 2005/0125503 | A1 | 6/2005 | Iyengar et al. | |
| 2005/0131903 | A1* | 6/2005 | Margolus et al. | 707/10 |
| 2006/0288026 | A1* | 12/2006 | Zayas et al. | 707/101 |
| 2007/0067256 | A1* | 3/2007 | Zayas et al. | 707/1 |
| 2007/0088702 | A1* | 4/2007 | Fridella et al. | 707/10 |
| 2008/0126369 | A1* | 5/2008 | Ellard | 707/100 |
| 2008/0126434 | A1* | 5/2008 | Uysal et al. | 707/201 |
| 2011/0137863 | A1* | 6/2011 | Anzai et al. | 707/639 |

OTHER PUBLICATIONS

Bill Nowicki, "NFS: Network File System Protocol Specification," Network Working Group, Request for Comments: 1094, Mar. 1989, 27 pages, Sun Microsystems, Inc., Mountain View, CA.

Paul J. Leach and Dilip C. Naik, "A Common Internet File System," Dec. 19, 1997, 121 pages, Microsoft Corporation, Redmond, WA.

"Sun Microsystems Gives Key Component of Network File System (NFS) to the Open Source Community," Feb. 2, 2000, 2 pages, Sun Microsystems, Inc., Mountain View, CA.

"Data General, Digital, Intel, Intergraph, Network Appliance and Others Join Microsoft in Support of Common Internet File System," Jun. 13, 1996, 2 pages, Microsoft Corporation, Redmond, WA.

Andy Watson & Paul Benn, Multiprotocol Data Access: NFS, CIFS, and HTTP, TR3014, published at least as early as Jul. 12, 2002, 29 pages, Network Appliance, Inc., Sunnyvale, CA.

Brian Pawlowski et al., "The NFS Version 4 Protocol," Technical Report TR3085, 2005, 30 pages, Network Appliance, Inc., Sunnyvale, CA.

Stern et al., Managing NFS and NIS, Sec. 7.2, "NFS protocol and implementation," Jun. 2001, 7 pages, O'Reilly Media, Inc., Sebastopol, CA.

"File System Permissions," Wikipedia, Mar. 14, 2007, 5 pages, Wikimedia Foundation Inc., San Francisco, CA.

"Filesystem Manager—VxFS," published at least as early as Oct. 28, 2000, 2 pages, Fujitsu Computers, Tokyo, Japan.

"GetFileInformationByHandle," Platform SDK: File Systems, published at least as early as Jun. 2, 2005, 3 pages, Microsoft Corporation, Redmond, WA.

Neil Brown, "The Linux Kernel NFSD Implementation," Oct. 13, 1999, 6 pages, School of Computer Science and Engineering, University of New South Wales, Sydney, Australia.

HP-UX 11i Release Notes, HP 9000 Computers, Edition 1, 2000, pp. 249-252, Hewlett-Packard Company, Palo Alto, CA.

"Open Solaris dnlc.c Filesystems," program listing, 2006, 32 pages, opensolaris.org, Sun Microsystems, Inc., Mountain View, CA.

"PSTAT Interfaces," white paper, May 2000, 44 pages, Hewlett-Packard Company, Palo Alto, CA.

Eric Schrock, "Reflections on OS addiction," Jul. 21, 2004, Sun Microsystems, Inc., Mountain View, CA.

"DNLC Improvements," Solaris 8 System Administration Supplement, printed Mar. 9, 2007, 3 pages, Sun Microsystems, Inc., Mountain View, CA.

Panagiotis Christias, "access(2)," Linux Programmer's Manual, printed Mar. 28, 2007, 3 pages, The University of Mississippi, University, MS.

Uresh Vahalia, Cary C. Gray, Dennis Ting, Metadata Logging in an NFS Server, USENIX 1995, Jan. 16-20, 1995, New Orleans, Louisiana, 12 pages, the Usenix Association, Berkeley, CA.

Panagiotis Christias, UNIX man pages : symlink( ), printed Mar. 28, 2007, 3 pages,The University of Mississippi, University, MS.

Avishay Traeger et al., "NFS File Handle Security," Computer Science Department Technical Report FSL-04-03, May 2004, 13 pages, Stony Brook University,Stony Brook, NY.

* cited by examiner

CIFS ACCESS TO NFS FILES AND DIRECTORIES BY TRANSLATING NFS FILE HANDLES INTO PSEUDO-PATHNAMES

FIELD OF THE INVENTION

The present invention relates generally to network file access protocols, and more particularly to sharing files between clients using different network file access protocols. The present invention specifically relates to translating file handles into file names.

BACKGROUND OF THE INVENTION

For convenient reference to stored computer data, the computer data is typically contained in one or more files. Each file has a logical address space for addressing the computer data in the file. Each file also has attributes including an alphanumeric name for identifying the file. In a typical general purpose digital computer or in a file server, an operating system program called a file system manager maps the logical address space of the file to a storage address space of at least one data storage device such as disk drive, and also manages access to attributes of the file. The mapping information and attributes of the file are generally referred to as metadata of the file.

Typically a human user or an application program accesses the computer data in a file by requesting the file system manager to open the file. After the file system manager returns an acknowledgement that the file has been opened, the user or application program sends requests to the file system manager for reading data from or writing data to specified logical addresses of the file.

To request the opening of the file, the user or application program specifies the alphanumeric name for the file. The file system manager searches one or more directories for the specified name of the file. A directory is a special kind of file. The directory includes an alphanumeric name for each file in the directory. The directory also includes a numeric address of the metadata for each file in the directory. Once the file system manager finds the specified name in the directory, it may open the file, and use the numeric address of the metadata associated with the specified name for reading or writing data to the file.

For referencing a large number of files, the files typically are grouped together in a file system including a hierarchy of directories. Each file is specified by a unique alphanumeric pathname through the hierarchy. The pathname includes the name of each directory along a path from the top of the hierarchy down to the directory that includes the file. To open the file, the user or application program specifies the pathname for the file, and the file system manager searches down through the directory hierarchy until finding the metadata of the file.

Because a search for a file may require multiple directories to be scanned along the path through the hierarchy, the search may require considerable time. Therefore, the search is typically performed no more than once each time that a file is opened. In a network environment, when a file server locates a file for a client, the file server returns a file handle that is used by the client for specifically identifying the file in subsequent requests to read data from or write data to the file. The file server may decode the file handle to determine the numeric address of the metadata associated with the file, without another search in a directory of the file system.

In practice, the specific encoding of the file handle depends on the particular network file access protocol used by the client and the file server, and may also depend on the particular version of the software used by the file server. Therefore, the file handle provided by one network file access protocol for access to a file cannot be used by another network file access protocol as the file handle for reading or writing to the same file. Consequently, the conventional procedure for sharing access to a file between two network clients using different file access protocols is for each client to use the pathname for the file in order to obtain a different file handle for reading or writing data to the file.

The sharing of file access between Network File System (NFS) clients and Common Internet File System (CIFS) clients is especially problematic due to the stateless nature of the NFS protocol. If an NFS client has been using the NFS file handle to access data of the file, the file server may not contain state information that would identify the pathname of the file existing when the file handle was issued to the client. Nevertheless, it may be desired to use a CIFS client to access the file given the NFS file handle.

One way of providing a CIFS client with access to a file given the NFS file handle is to access the file system directory and caches of directory name information in the file server to perform a reverse lookup of a file system pathname given the NFS file handle. Unfortunately, such a reverse lookup is laborious and may not result in the correct pathname for the file if the file has been subject to migration and renaming since it was opened by the NFS client. To obtain the correct pathnames for such volatile file handles, a persistent mapping database from file handle to pathname has been maintained in nonvolatile memory or storage. But this approach involves not only the cost of additional nonvolatile memory or storage but also additional processing time whenever a file handle is issued.

SUMMARY OF THE INVENTION

In accordance with one aspect, the invention provides a method of accessing a file in a file server. The file server stores a file system including the file and a directory including a name of the file. The file also has a pathname including the name of the directory and the name of the file in the directory. The method includes the file server producing a file handle for locating the file in the file server. The method also includes encoding the file handle in a pseudo-pathname, and a client using the pseudo-pathname as a substitute for the pathname of the file in a network file access protocol for accessing the file in the file server. The method further includes the file server recognizing that the pseudo-pathname has been used as a substitute for the pathname of the file in the file access protocol, and upon recognizing that the pseudo-pathname has been used as a substitute for the pathname of the file in the file access protocol, the file server decoding the file handle from the pseudo-pathname and using the file handle for locating and accessing the file in the file server without searching any directory of the file system.

In accordance with another aspect, the invention provides a method of sharing access to a file of a file system between a first client and a second client. The file system is stored in a file server providing service to the first client and the second client. The method includes the first client using the Network File Access (NFS) protocol to send to the file server a directory lookup request to locate a file specified by a name of the file. The file server responds by locating the file and returning an NFS file handle to the first client. The first client uses the NFS protocol to send to the file server a write request including the NFS file handle to write data to the file, and the file server responds by writing the data to the file. The method further includes the second client using the Common Internet File System (CIFS) protocol to send to the file server a request to open the file. The request to open the file includes a pseudo-pathname specifying the file. The pseudo-pathname is used as a substitute for a pathname of the file in the CIFS protocol. The file server decodes the NFS file handle from the pseudo-pathname and uses the NFS file handle for locating and opening the file, and the file server returns to the second client a File ID. The second client uses the CIFS protocol to send to the file server a read request including the File ID to read the data from the file, and the file server responds by reading the data from the file and returning the data read from the file to the second network client.

In accordance with yet another aspect, the invention provides a file server. The file server includes data storage for storing a file system, at least one data processor coupled to the data storage for accessing the file system in the data storage, and a network interface coupled to the at least one data processor for data communication between network clients and the at least one data processor. The at least one data processor is programmed for providing the network clients with access to the file system using the Network File System (NFS) protocol and the Common Internet File System (CIFS) protocol. The at least one data processor is programmed for providing a first network client with access to the file system using the NFS protocol for receiving from the first network client a directory lookup request including a name of the file and in response providing to the first network client an NFS file handle identifying the file in the file server, and for receiving from the first network client a request including the file handle for writing data to the file and in response writing the data to the file. The at least one data processor is also programmed for providing a second network client with access to the file system using the CIFS protocol for receiving from the second network client a pseudo-pathname specifying the file. The NFS file handle is encoded in the pseudo-pathname and the pseudo-pathname is used as a substitute for a pathname of the file in the CIFS protocol. The at least one data processor is further programmed to recognize that the pseudo-pathname has been used in the CIFS protocol as a substitute for the pathname and upon recognizing that the pseudo-pathname has been used in the CIFS protocol as a substitute for the pathname then decoding the NFS file handle from the pseudo-pathname and using the NFS file handle for accessing the file to enable the second client to read the data from the file.

BRIEF DESCRIPTION OF THE DRAWINGS

Additional features and advantages of the invention will be described below with reference to the drawings, in which.

Figure 1:
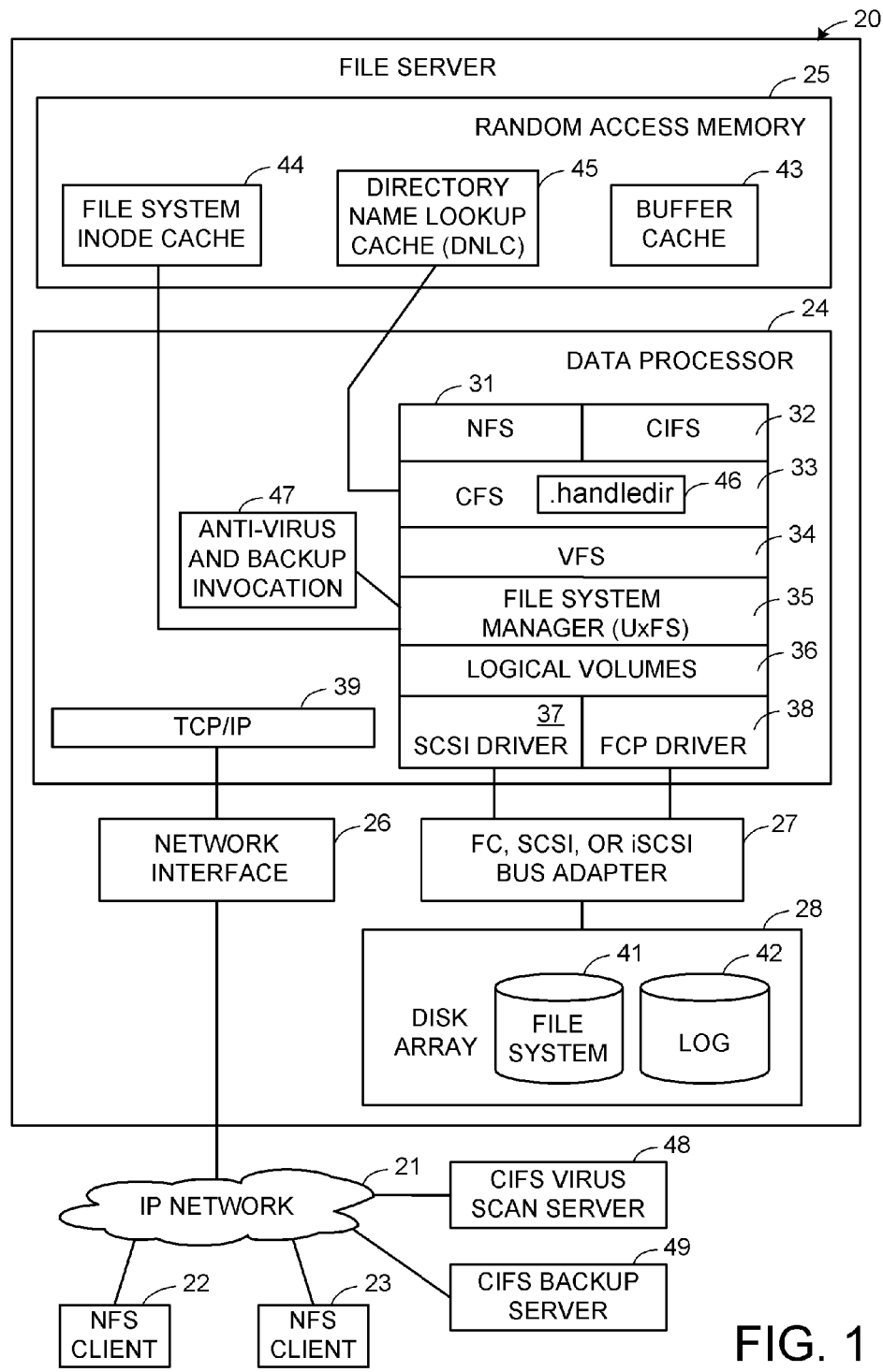
FIG. 1 is block diagram of a data processing system using the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown an Internet Protocol (IP) data network 21 linking a file server 20 to NFS clients 22, 23 and CIFS clients 48, 49. The file server 20 includes at least one data processor 24, random access memory 25, and a disk storage array 28. A network interface 26 provides an IP port for the data processor 24. A Fibre Channel (FC), Small Computer System Interface (SCSI), or Internet Small Computer System Interface (iSCSI) bus adapter 27 links the disk storage array 28 to the data processor 24. The data processor 24, random access memory 25, bus adapter 27, and network interface 26, for example, comprise a high-end commodity computer.

The data processor 24 is programmed with a protocol stack including a Network File System (NFS) protocol module 31 and a Common Internet File System (CIFS) protocol module 32 for providing the clients 22, 23, 48, 49 with file access protocols over the IP network 21. The Network File System (NFS) protocol is typically used to receive file access commands from clients that use the UNIX® operating system or the Linux® operating system, and the Common Internet File System (CIFS) protocol is typically used to receive file access commands from clients that use the Microsoft (MS) Windows® operating system. The NFS file access protocol is described in Bill Nowicki, "NFS: Network File System Protocol Specification," Network Working Group, Request for Comments: 1094, Sun Microsystems, Inc., Mountain View, Calif., March 1989. The CIFS file access protocol is described in Paul L. Leach and Dilip C. Naik, "A Common Internet File System," Microsoft Corporation, Redmond, Wash., Dec. 19, 1997.

Data packets from the clients 22, 23, 48, 49 are received at the network interface 26, and transferred by a TCP/IP module 39 to buffer cache 43. The NFS protocol module 31 or the CIFS protocol module 32 recognizes file access requests in the data packets. Data to be read from or written to a file is also streamed through the buffer cache 43 between the network interface 26 and the bus adapter 27. The NFS protocol module 31 and the CIFS protocol module 32 are layered over a Common File System (CFS) module 33. The CFS module is layered over a Virtual File System (VFS) module 34. The VFS module 34 is layered over a Unix®-based File System (UxFS) module 35.

The UxFS module 35 is a file system manager for managing a UNIX®-based file system 41 in storage of the disk array 28. Management of a UNIX®-based file system is described in Uresh Vahalia, Unix Internals: The New Frontiers, Chapter 9, "File System Implementations," Prentice-Hall, Inc., New Jersey, 1996, p. 261-289. The UxFS module 35 maintains a file system inode cache 44 in the random access memory 25, and logs file system metadata transactions to a file system log 42 in the disk array 28.

The UxFS module 35 accesses data organized into logical volumes defined by a logical volume layer module 36. Each logical volume maps to storage addresses in the disk array 28. The data processor 24 sends storage access requests to the disk array 28 through the bus adapter 27 using the FC, SCSI, or iSCSI protocol.

For supporting NFS file access, the CFS module 33 accesses a global cache 45 of directory pathname components. This cache 45 is called the directory name lookup cache (DNLC). The CFS layer 34 uses the DNLC 45 for pathname to file handle translation. Each DNLC cache entry contains an alphanumeric name of a directory or file, and a numeric address of the directory or file in the inode cache 44. If there is a cache miss upon lookup in the DNLC 45, then the CFS layer 34 reads directory entries from the file system inode cache 44 or the file system 41 on disk and scans the directory entries to find the named directory or file.

Further details regarding the construction of a network file server are found in Vahalia et al., U.S. Pat. No. 5,893,140 issued Apr. 6, 1999, incorporated herein by reference, and Xu et al., U.S. Pat. No. 6,324,581, issued Nov. 27, 2001, incorporated herein by reference.

The present invention specifically relates to encoding a file handle in a pseudo-pathname that can be used by a file access protocol. Such an encoding of an NFS file handle can enable easily a CIFS client to access a file including data from an NFS client. Moreover, the encoding need not involve any decoding of the NFS file handle, so that the encoding process is generally applicable to various versions of NFS on file servers from various vendors. The encoding can be done at a level of the protocol stack below the NFS module and the CIFS module so that there is no need for modification of the NFS module or the CIFS module. Furthermore, the encoding process does not need any caching of translation information or server state information, and the encoding permits the file to be opened in the CIFS protocol without a directory search of the file system. Therefore the present invention may decrease, rather than increase, the processing time for file access when access to a file is shared between an NFS protocol client and a CIFS protocol client.

The file handle of a file in accordance with a first file access protocol such as NFS is encoded into a pseudo-pathname, and the pseudo-pathname is used by the second file access protocol for accessing the file. The pseudo-pathname includes a series of alphanumeric names separated by delimiters, so that it generally has the format of a true pathname and therefore can be substituted for a true pathname in the second file access protocol, yet the file server can recognize the pseudo-pathname as a substitute for a true pathname. For example, the pseudo-pathname includes a special name indicating that a file handle should be decoded from the pseudo-pathname. For accessing the file in accordance with the second file access protocol, before searching the directory hierarchy of the file system, the pseudo-pathname is recognized as including a translation of the file handle of the first file access protocol. Thus, the file handle is decoded from the pseudo-pathname and used as it is used in the first file access protocol for finding the file without searching the directory hierarchy. Then the file is accessed in accordance with the second file access protocol.

In a preferred implementation, the file handle is encoded in a pseudo-pathname by converting the file handle into an ASCII name for a file in a pseudo-directory in the pseudo-pathname. A special name for the pseudo-directory immediately follows the file system root directory name (e.g., share name or mountpoint name) at the beginning of the directory pathname. Thus, the special name for the pseudo-directory is recognized in the pathname before a search of the root directory, and the file handle in accordance with the first file access protocol is obtained by an ASCII character to number conversion of the ASCII name for the file.

In a preferred implementation, the pseudo-directory does not reside on disk, so that an inode in the file system is not allocated for storing any attributes or metadata for the pseudo-directory. Therefore, the pseudo-directory cannot be looked up, opened, or otherwise processed as if it were a normal directory. Instead, the pseudo-directory exists as a special name in a lookup process preformed by the CFS layer 33 when parsing pathnames starting in the root of a given file system. For example, the special name is ".handledir" and its usage is defined by a set of program routines 46 in the CFS layer 33. However, the pseudo-directory can be given any special name not already used in the file system.

For example, if an attempt is made to look up the pseudo-directory using the UNIX® operating system command "ls /mountpoint/.handledir", then the command will fail and operating system will return an error "permission denied." If an attempt is made to look up the "file handle name" of a file handle that exists in the file system "mountpoint" using the UNIX® operating system command "ls /mountpoint/.handledir/file handle name", then the command will succeed if the requesting process has the appropriate permissions. If an attempt is made to change the current directory to ".handledir" using the UNIX® operating system command "cd /mountpoint/.handledir", then this command will succeed so long as "mountpoint" is the mount point of a server share exported from the root of a file system.

Figure 2:
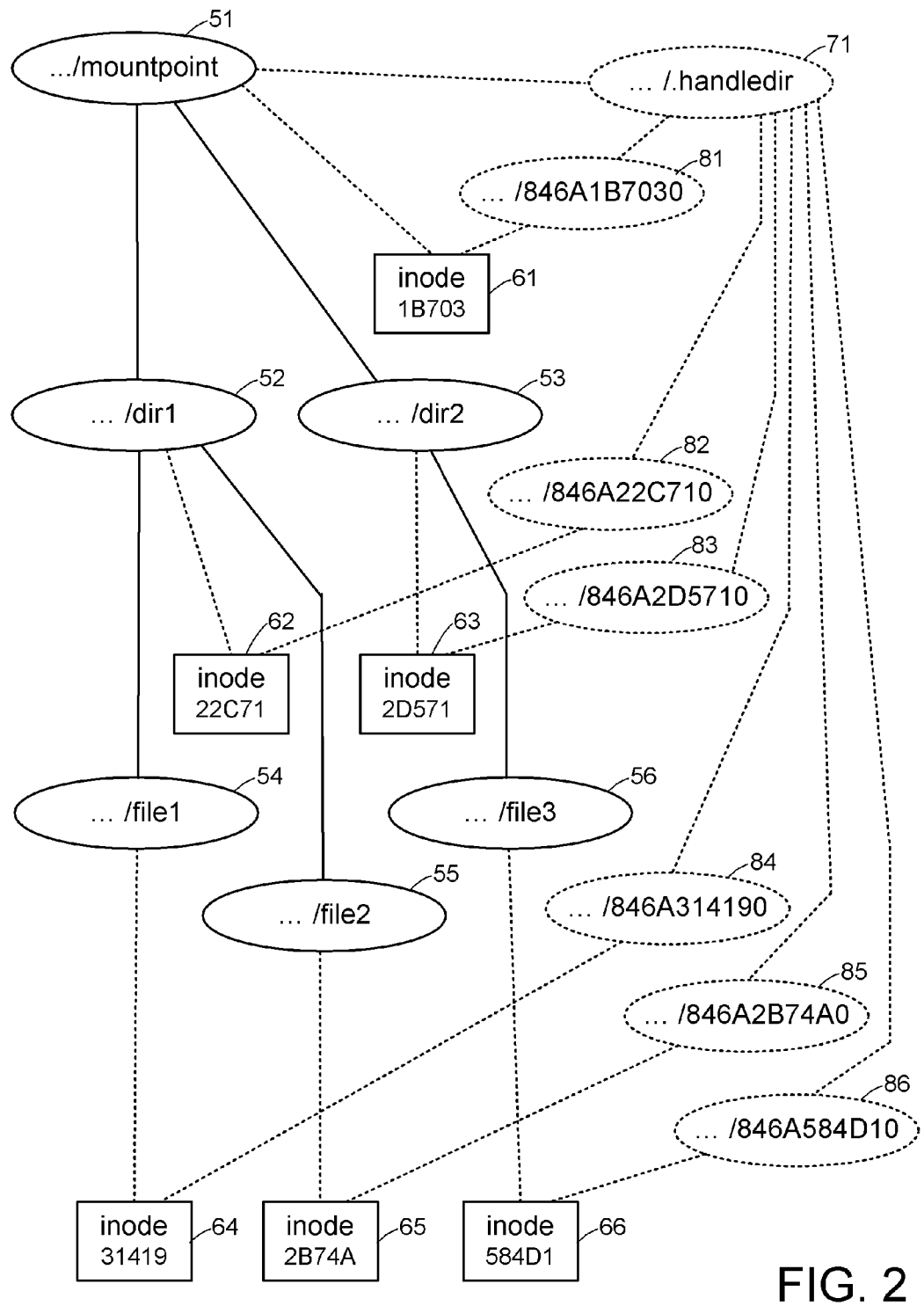
FIG. 2 is a block diagram of a file system and a pseudo-directory of file handles for directories and files in the file system.

FIG. 2 shows various file system objects accessible to the CFS layer of the file server. As presented to the upper NFS protocol module and the CIFS protocol module in a conventional fashion, the file system includes a root directory 51, subdirectories 52 and 53 contained in the root directory 51, files 54 and 55 contained in the subdirectory 52, and a file 56 contained in the subdirectory 53. As provided by the lower UxFS file system manager, each of these directories and files of the file system includes at least one file system block called an inode containing attributes of the file system component. Thus, the root directory 51 includes an inode 61, the directory 52 includes an inode 62, the directory 53 includes an inode 63, the file 54 includes an inode 64, the file 55 includes an inode 65, and the file 56 includes an inode 66.

In order to open a file in the file system, a user or application program of a client may provide a pathname of the file in the file system. The pathname includes not only an alphanumeric name of the file but also the names of the directories in the file system along a path in the directory hierarchy from the root directory to the file. For example, in the file system of FIG. 2, the file 56 has a component name "file3" and a pathname "/dir2/file3".

To access the file 56 using the NFS protocol, the user's client sends a series of directory lookup requests to the file server in order to locate the file 56 and obtain a handle for the file 56. A distinct directory lookup request is sent for each component of the pathname. For example, assuming that the client has a handle for the mountpoint directory 51, the first directory lookup request is a request for the handle of the subdirectory 53 named "dir2" in the mountpoint directory 51. The CFS layer responds to this requests by searching the mountpoint root directory 51 to find the component name "dir2", and upon finding the component name "dir2," reading from the mountpoint directory a pointer to the directory 53, and returning a handle for the directory 53 to the NFS client. A second directory lookup request is a request for the handle of the file 56 named "file3" in the subdirectory 53. The CIFS layer responds by searching the directory 53 for the component name "file3", and upon finding the component name "file3", reading from the directory 53 a pointer to the file 56, and returning a handle for the file 56 to the NFS client. The NFS client includes the file handle in subsequent requests for access to the file 56. When responding to a subsequent request for access to the file, the file server uses the file handle to locate quickly the inode 66 of the file 56.

The NFS file handle typically includes an identifier of the file system and the inode number of the file in the file system. However, the information encoded into the file handle may vary from one version of the NFS protocol to another, and may also vary between file servers using the same version of the NFS protocol. For example, the NFS file handle may include a four byte code for the type of the file system, a four byte file system ID, a four byte inode number, and a four byte inode generation count.

For many applications, it is desired for a CIFS client to access a file that has been accessed by an NFS client. Typically this is done by the NFS client passing the pathname of the file to the CIFS client, and the CIFS client using the pathname to open the file, and then the CIFS client accessing the file. For some applications, however, the NFS file handle is known, but the pathname of the file is not readily available. This is the case for internal applications of the file server when responding to a file access error when the NFS client has specified a file handle for the file access, or when performing virus checking or backup of a file when the NFS client has modified a file.

To permit the CIFS client to open a file having a specified NFS file handle, the specified NFS file handle is encoded into a pseudo-pathname, and the CIFS client uses the pseudo-pathname in a request to the file server for opening the file. When the CIFS protocol module receives the request for opening the file, it in turn requests the CFS module to open the file, and the CFS module decodes the NFS file handle from the pseudo-pathname and uses the NFS file handle to locate the Mode of the file without a search of the directory hierarchy. For example, an internal application of the file server calls a "handle_to_hex" function to convert the file handle to an ASCII string of hexadecimal digits representing the numeric value of the file handle. Then the ASCII string is appended to the name of the file system root directory followed by a special name ".handledir". The special name ".handledir" signals to the CFS module that the pathname is a pseudo-pathname from which a pointer to an Mode in the file server should be decoded so that a search through the file system hierarchy should not be used for locating the inode specified by the pseudo-pathname. The special name ".handledir" also indicates that there is a pseudo-directory object in the file system.

In the specific example of FIG. 2, for the sake of illustration, the NFS file handles have been reduced in length to ten hexadecimal digits, and the inode numbers have been reduced in length to five hexadecimal digits. Thus, "584D1" is the hexadecimal representation of the inode number for the inode 66 of the file 56 named "file3", and "846A584D10" is the hexadecimal representation and the ASCII string for the file handle for the file 56. " . . . /mountpoint/dir2/file3" is the pathname for the file 56 in the file system having the root directory 51 named "mountpoint", and " . . . /mountpoint/.handledir/846A584D10" is the pseudo-pathname for the file 56. Thus, the CFS module makes the file system appear as if it has an additional directory 71 and alias names 81, 82, 83, 84, 85, 86 for each inode of the file system. The directory 71 is referred to as a pseudo-directory because it has no corresponding inode in the file system yet certain directory operations are permitted upon it, as will be described below with reference to FIG. 5.

Figure 3:
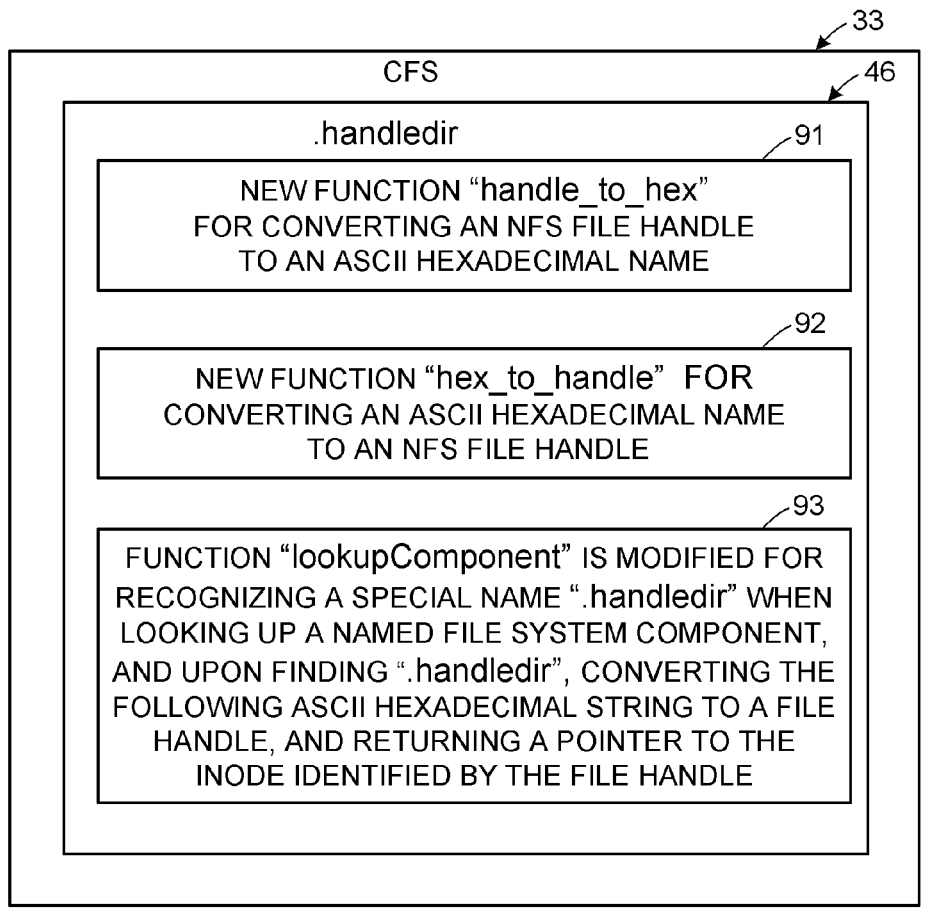
FIG. 3 is a block diagram of software functions supporting the pseudo-directory of file handles.

FIG. 3 shows software functions added to the CFS layer 33 for supporting the pseudo-directory 46 of file handles. These functions includes a function "handle_to_hex" 91 for converting an NFS file handle to an ASCII character string in hexadecimal notation representing the numeric value of the NFS file handle, a function "hex_to_handle" 92 for converting an ASCII character string in hexadecimal notation to an NFS file handle, and a "lookupComponent" function 93 that has been modified to recognize a pseudo-pathname encoding an NFS file handle and to decode the NFS file handle from the pseudo-pathname.

The function "handle_to_hex" passes the NFS file handle to a conventional numeric value to hexadecimal string conversion routine for encoding the numeric value of the NFS file handle in hexadecimal representation. Therefore each byte of the NFS file handle is represented as two ASCII characters. Each nibble (i.e., successive four bits) of each byte is converted to a corresponding ASCII character according to the following conversion table:

| Nibble | Character | ASCII Code |
| --- | --- | --- |
| 0000 binary | "0" | 30 hex |
| 0001 binary | "1" | 31 hex |
| 0010 binary | "2" | 32 hex |
| 0011 binary | "3" | 33 hex |
| 0100 binary | "4" | 34 hex |
| 0101 binary | "5" | 35 hex |
| 0110 binary | "6" | 36 hex |
| 0111 binary | "7" | 36 hex |
| 1000 binary | "8" | 38 hex |
| 1001 binary | "9" | 39 hex |
| 1010 binary | "A" | 41 hex |
| 1011 binary | "B" | 42 hex |
| 1100 binary | "C" | 43 hex |
| 1101 binary | "D" | 44 hex |
| 1110 binary | "E" | 45 hex |
| 1111 binary | "F" | 46 hex |

Therefore, each nibble of the NFS file handle can be converted to an ASCII code value for an alphanumeric character according to the value of the nibble as follows:

If nibble≤9 then char=nibble+30 hex;
    Else char=nibble+37 hex;

The function "hex_to_handle" passes the hexadecimal string to a conventional hexadecimal string to numeric conversion routine for decoding the NFS file handle from the hexadecimal string. Each character of the hexadecimal string is converted to a nibble of the file handle in accordance with the conversion table above. Therefore, each ASCII code value can be converted to a nibble as follows:

If char < 30 hex then return error;
  Else if char < 3A hex then return nibble = char − 30 hex;
    Else if char < 41 hex then return error;
      Else if char < 47 hex then return nibble = char−37 hex;
        Else return error;

The "lookupComponent" function recognizes a special name ".handledir" in a pathname when looking up a named file system component. Upon finding ".handledir" in the pathname, the "lookupComponent" function converts the next name in the pathname to an NFS file handle by invoking the "hex_to_handle" function. Then the "lookupComponent" function uses the NFS file handle to locate the inode of the file identified by the NFS file handle, and to return a pointer to this inode.

Figure 4:
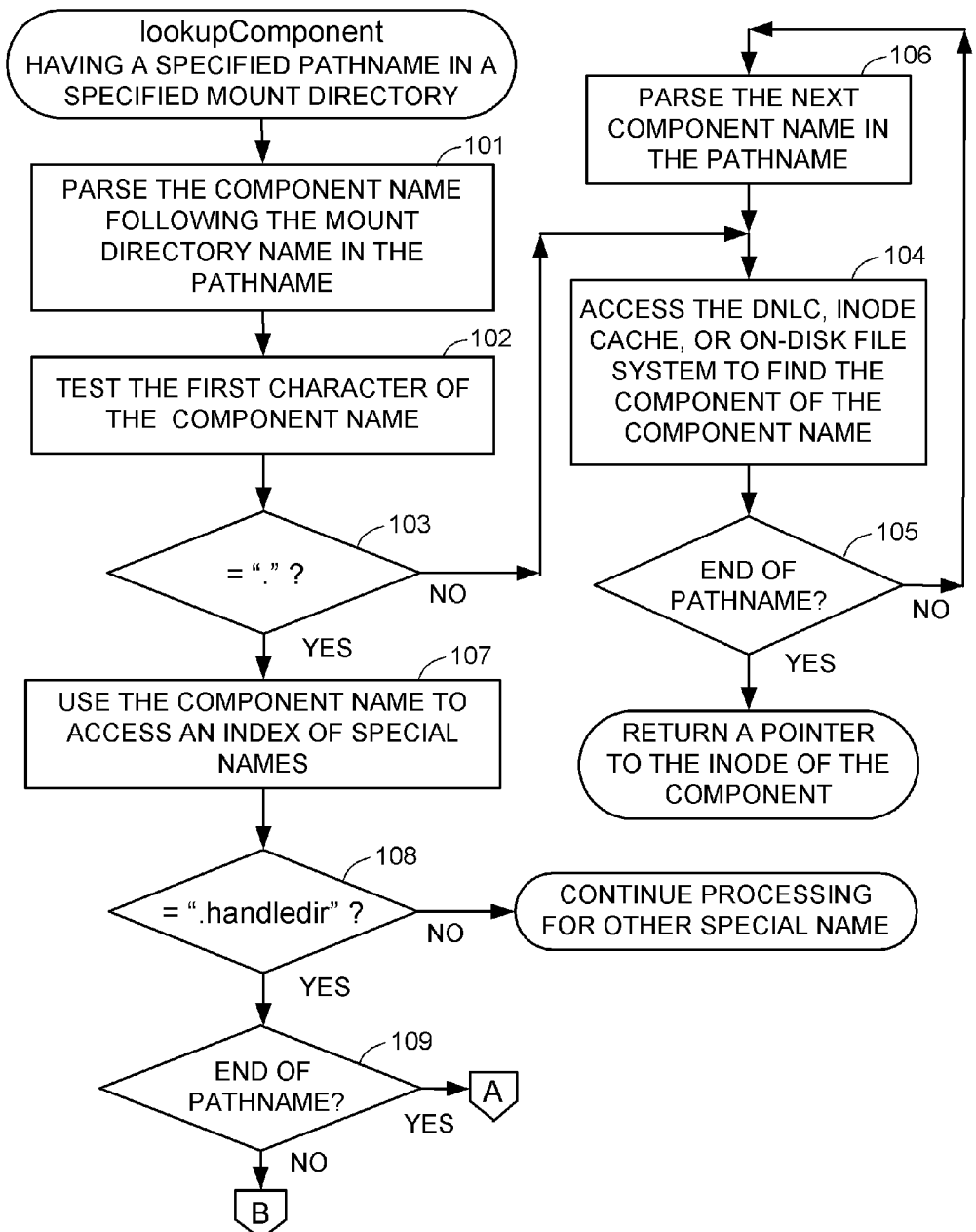
FIGS. 4 to 6 comprise a flowchart of a "lookupComponent" function that recognizes a special name for the pseudo-directory of file handles when parsing a specified pathname in a specified mount directory.
Figure 5:
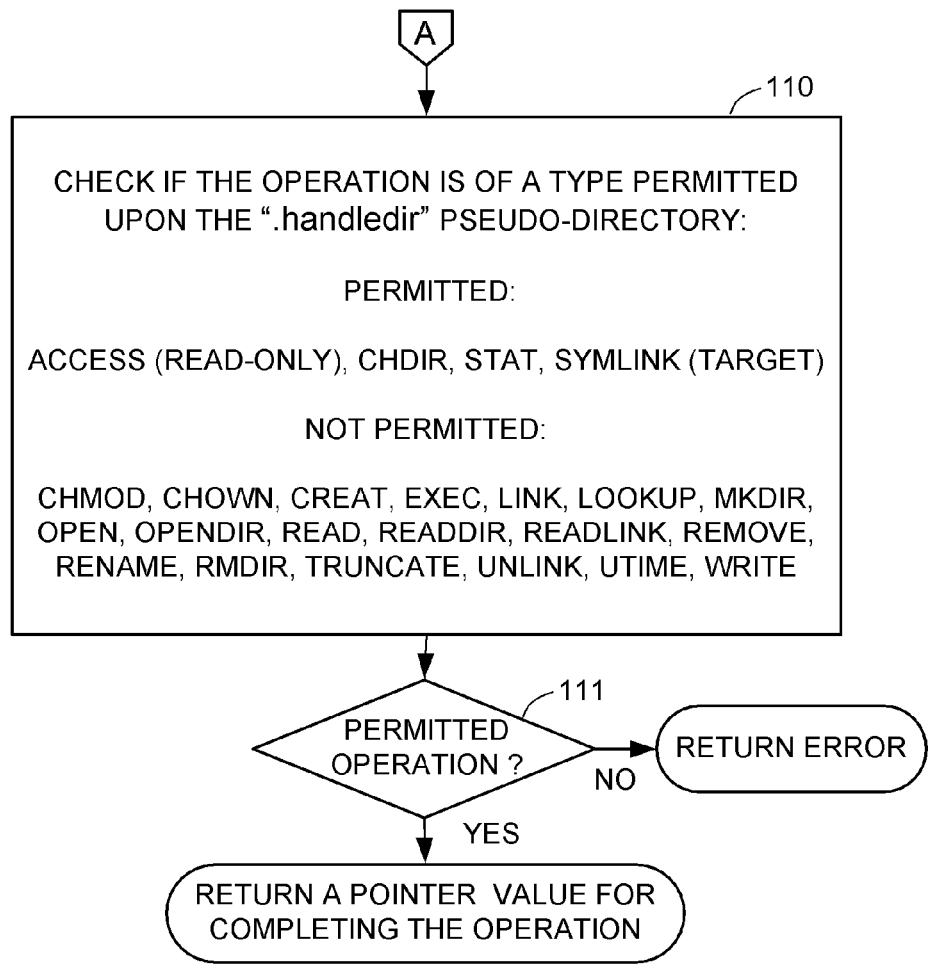
Figure 6:
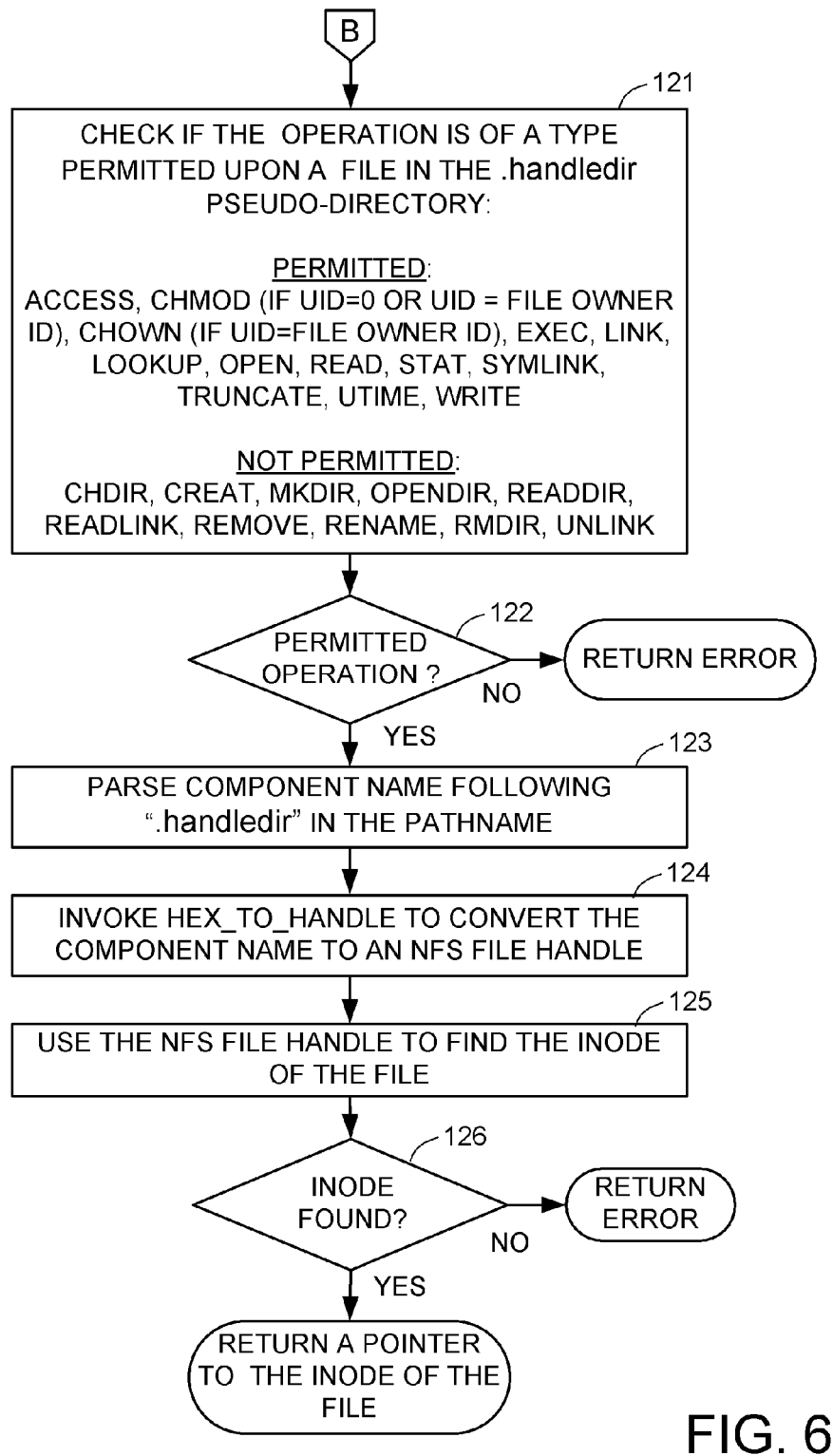
Figure 7:
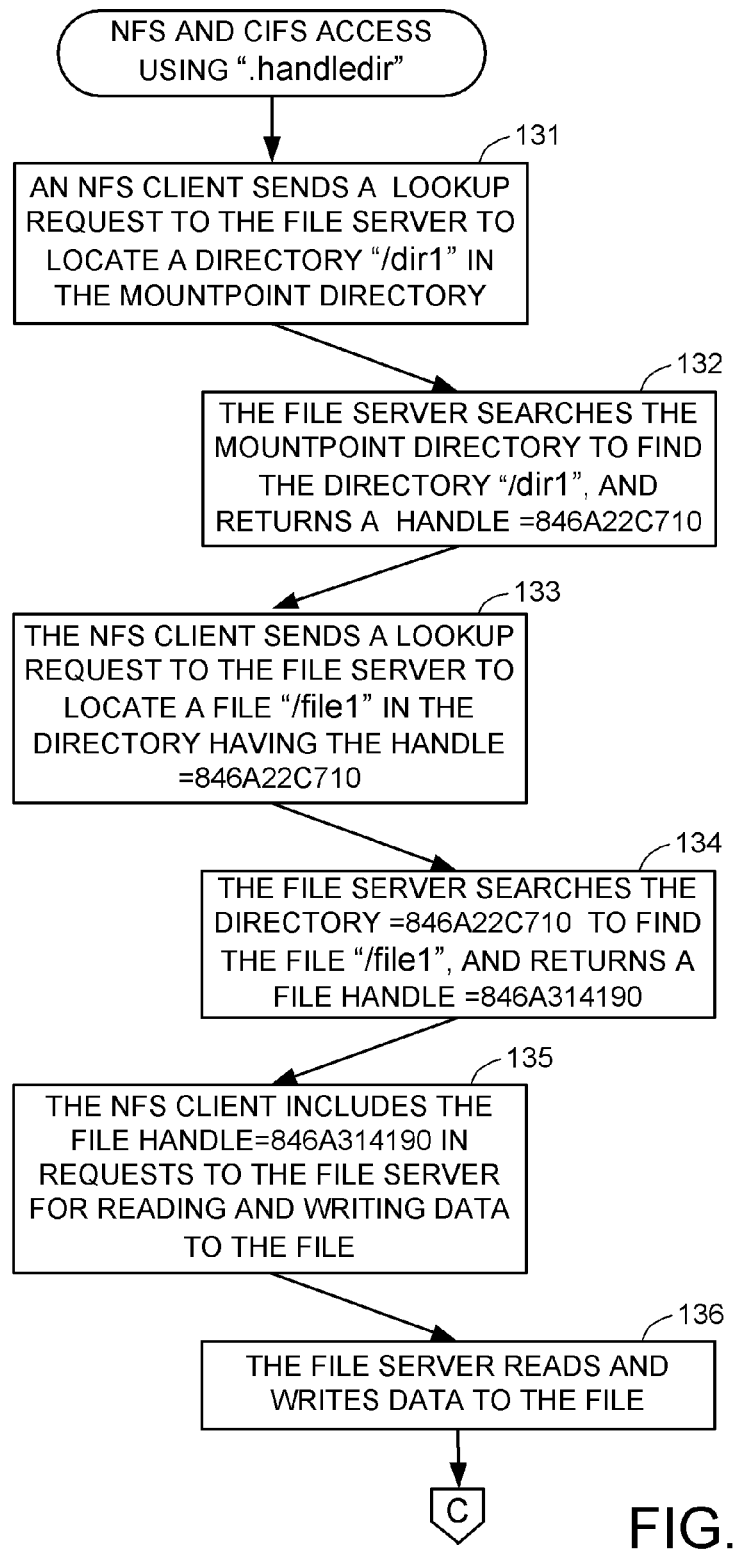
FIGS. 7 to 11 show an example of shared file access between NFS and CIFS clients in the data processing system of FIG. 1 for anti-virus scanning and file backup by the CIFS clients when an NFS client has modified data of the file.

FIGS. 4 to 6 show details of the "lookupComponent" function. In a first step 101, the component name following the mount directory name is parsed from the pathname. In step 102, the first character of this component name is tested. In step 103, if this first character is not a period, then execution branches to step 104 to interpret the component name as the name of a subdirectory or file in the mount directory and to look for the component name and a pointer to its inode in directory information of the mount directory. In step 104, the DNLC, the inode cache, or the on-disk file system are accessed to find the component of the component name. In step 105, if the end of the pathname has not been reached, then execution branches from step 105 to step 106 to parse the next component name in the pathname. Execution continues from step 106 to step 104 to look for this next component name in directory information of the inode of the previous component name. In step 105, when the end of the pathname name has been reached, the "lookupComponent" function returns a pointer to the inode of the component.

In step 103, if the first character of the component name is a period, then execution continues to step 107. In step 107, the component name is used to access an index of special names. If the component name is found in this index of special names, then execution continues to a routine assigned for handling the special name; otherwise, execution continues to step 104. In particular, in step 108, if the component name is equal to ".handledir", then execution continues to step 109.

In step 109, if ".handledir" is at the end of the pathname, then execution continues to step 110 in FIG. 5. In this case, the ".handledir" is the component having the specified pathname. In a preferred implementation, ".handledir" does not have an inode in the file system of the mount directory. Nevertheless, it is desirable to permit ".handledir" to be specified as the target directory for a limited number of the operations that are performed upon directories. For these limited operations, the "lookupComponent" function will return neither an error nor a pointer to an inode, and instead will return a pointer value or code indicating that the operation should be completed in a fashion other than by accessing an inode for the component.

For example, in step 110, permitted operations upon ".handledir" include the UNIX® operating system commands "access" (read only), "chdir," "stat," and "symlink" (target). Operations that are not permitted upon ".handledir" include the UNIX® operating system commands "chmod," "chown," "creat," "exec," "link," "lookup," "mkdir," "open," "opendir," "read," "readdir," "readlink," "remove," "rename," "rmdir," "truncate," "unlink," "utime," and "write."

The access command reports that the process would be allowed to read or test for the existence of ".handledir" but not to write to ".handledir". The "chdir" operation results in the decoding of any subsequently used pathname being started in step 121 of FIG. 6, as if the pathname were prefixed by " . . . /mountdir/.handledir/". The "stat" command returns the file system status of " . . . /mountdir". The target of a symlink can be " . . . /mountdir/.handledir" but a symlink cannot be created in ".handledir".

In step 109 of FIG. 4, if ".handledir" is not at the end of the pathname, then execution continues to step 121 in FIG. 6. Step 121 checks whether or not the operation is of a type permitted upon a file in the ".handledir" pseudo-directory. For example, the UNIX® operating system commands "access," "chmod" (if UID=0 or UID=file owner ID), "chown" (if UID=file owner ID), "exec," "link" (target), "lookup," "open," "read," "stat," "symlink" (target), "truncate," "utime," and "write" are permitted. Operations that are not permitted upon a file in ".handledir" include the UNIX® operating system commands "chdir," "creat," "mkdir," "opendir," "readdir," "readlink," "remove," "rename," "rmdir," and "unlink." The target of a symlink or link can be a file in ".handledir" but a symlink or link cannot be created in "handledir." The operations "opendir" and "readdir" are not permitted in step 121 as a matter of policy. In order to provide enhanced security for "opendir" and "readdir," they are not performed upon a directory specified by a pseudo-pathname under most circumstances. However, certain CIFS applications or network clients could be given permission to perform the "opendir" and "readdir" operations upon a directory specified by a pseudo-pathname under appropriate circumstances such as handling an error when a file handle but not a pathname is known.

If an operation is not permitted, then execution returns from step 122 with an error code. Otherwise, execution continues from step 122 to step 123. Step 123 parses the component name following ".handledir" in the pathname. In step 124, the "handle_to_hex" function is invoked to convert the component name to an NFS file handle. In step 125, the NFS file handle is used to find the inode of the file, in the same fashion that the file server uses an NFS file handle from an NFS client. In step 126, if the inode is not found (for example, because the file handle has become stale), then execution returns with an error code. Otherwise, execution returns with a pointer to the inode of the file.

FIGS. 7 to 11 show an example of shared file access between NFS and CIFS clients in the data processing system of FIG. 1 for anti-virus scanning and file backup by the CIFS clients when an NFS client modifies data of a file named "/dir1/file1". In a first step 131, an NFS client sends a first lookup request to the file server to locate the directory named "/dir1" in the mountpoint directory. In step 132, the file server responds by searching the mountpoint directory to find the directory "/dir1" and return a handle having a numeric value of "846A22C710" hexadecimal. In step 133, the NFS client sends a second lookup request to the file server to locate the file named "/file1" in the directory having the handle=846/A22C710. In step 134, the file server responds by searching the directory having the handle=846/A22C710 to find the file named "/file1", and to return a file handle having a numeric value of "846A314190" hexadecimal. Then in step 135, the NFS client includes this file handle in requests to the file server for reading data from and writing data to the file. In step 136, the file server reads data from and writes data to the file.

Figure 8:
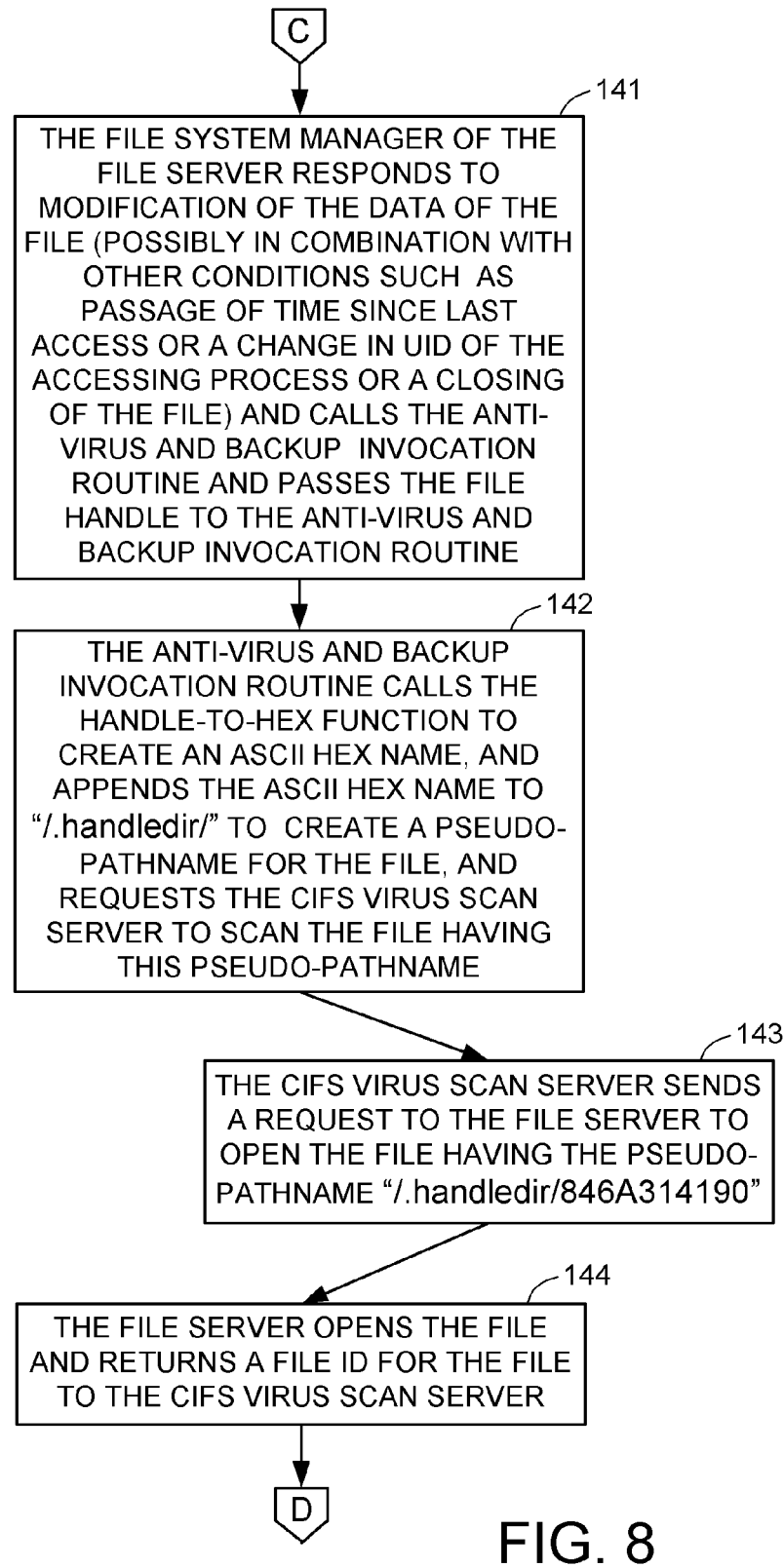

In step 141 of FIG. 8, the file system manager of the file server responds to modification of the data of the file, possibly in combination with other conditions such as passage of time since the last access or a change in the user ID (UID) of the client process or a closing of the file, by calling the anti-virus and backup invocation routine and passing the NFS file handle to the anti-virus and backup routine. At this point the file system manager recognizes that the file is in a state such that the file needs to be checked for viruses before the file may be further accessed by any client or application other than a virus scanner, and once the file has been checked for viruses and has not been found to be infected, the file needs to be backed up before any client or application other than a backup application may access the file. For example, if the file is being accessed by a version of NFS such as NFS v4 in which the file must be opened for client access, then the antivirus and backup invocation routine is called when the file is closed if the file has been modified since it was last scanned for viruses and backed up. If the file is being accessed by an earlier version of NFS that does not support file open and close semantics, then the antivirus and backup invocation routine is called when the file has not been accessed for a certain period of time after the file has been modified, or earlier when the file has been modified and another client process (i.e., having a different UID) attempts to access the file. Alternatively, the antivirus and backup invocation routine is called in response to an explicit request from a client to perform a virus check or a backup upon the file.

In step 142, the anti-virus and backup invocation routine calls the "handle_to_hex" function to create an ASCII hex name from the NFS file handle, and appends the ASCII hex name to "/.handledir/" to create a pseudo-pathname for the file, and requests the CIFS virus scan server to scan the file having this pseudo-pathname. In step 143, the CIFS virus scan server sends a request to the file server to open the file having the pseudo-pathname "/.handledir/846A314190". In step 144, the file server opens the file and returns a File ID for the file to the CIFS virus scan server. Execution continues from step 144 to step 151 of FIG. 9.

Figure 9:
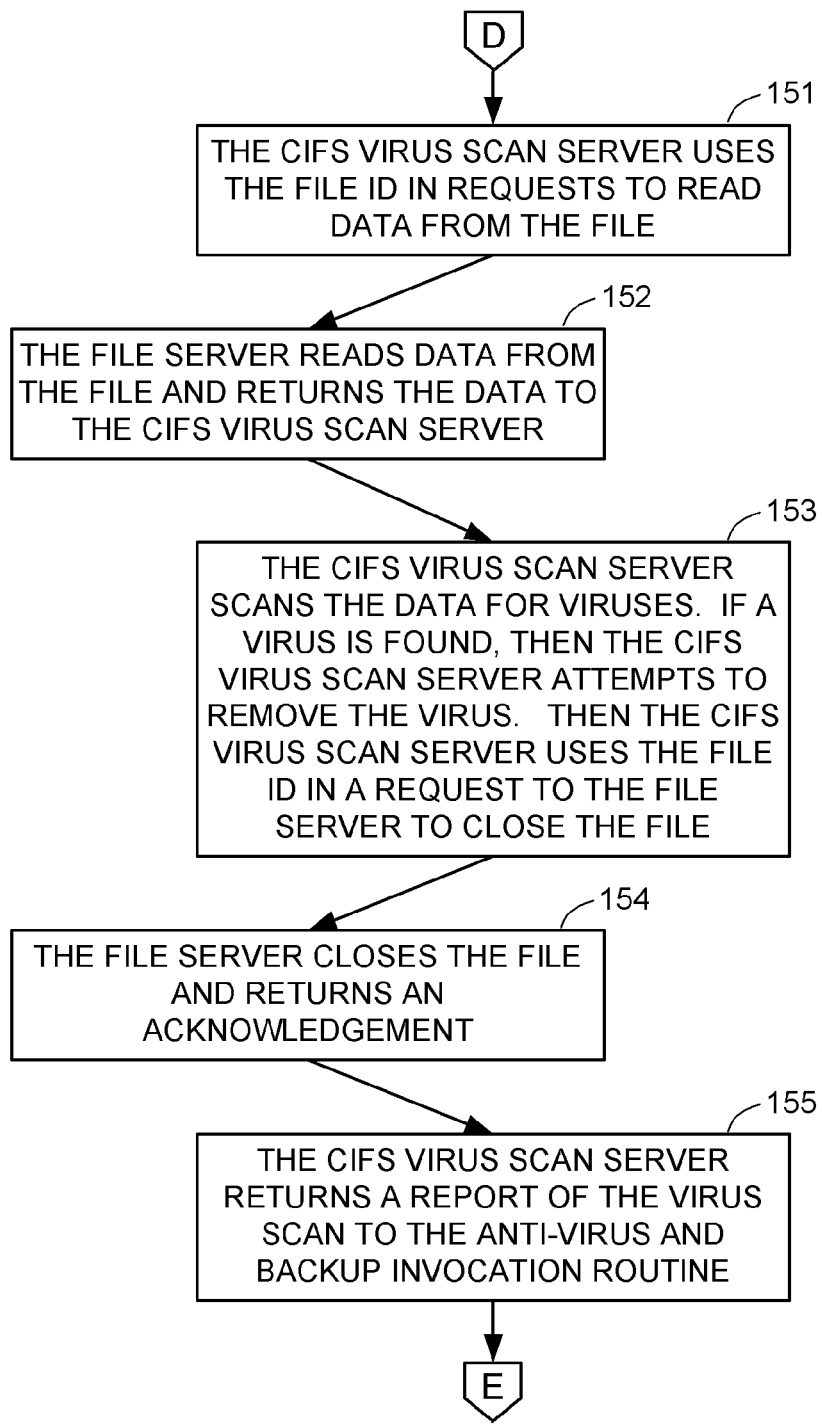

In step 151 of FIG. 9, the CIFS virus scan server uses the File ID in requests to read data from the file. In step 152, the file server reads data from the file and returns the data to the CIFS virus scan server. In step 153, the CIFS virus scan server scans the data for viruses. If a virus is found, then the CIFS virus scan server attempts to remove the virus from the file. Then the CIFS virus scanner uses the File ID in a request to the file server to close the file. In step 154, the file server closes the file and returns an acknowledgement. In step 155, the CIFS virus scan server returns a report of the virus scan to the anti-virus and backup invocation routine. Execution continues from step 155 to step 161 in FIG. 10.

Figure 10:
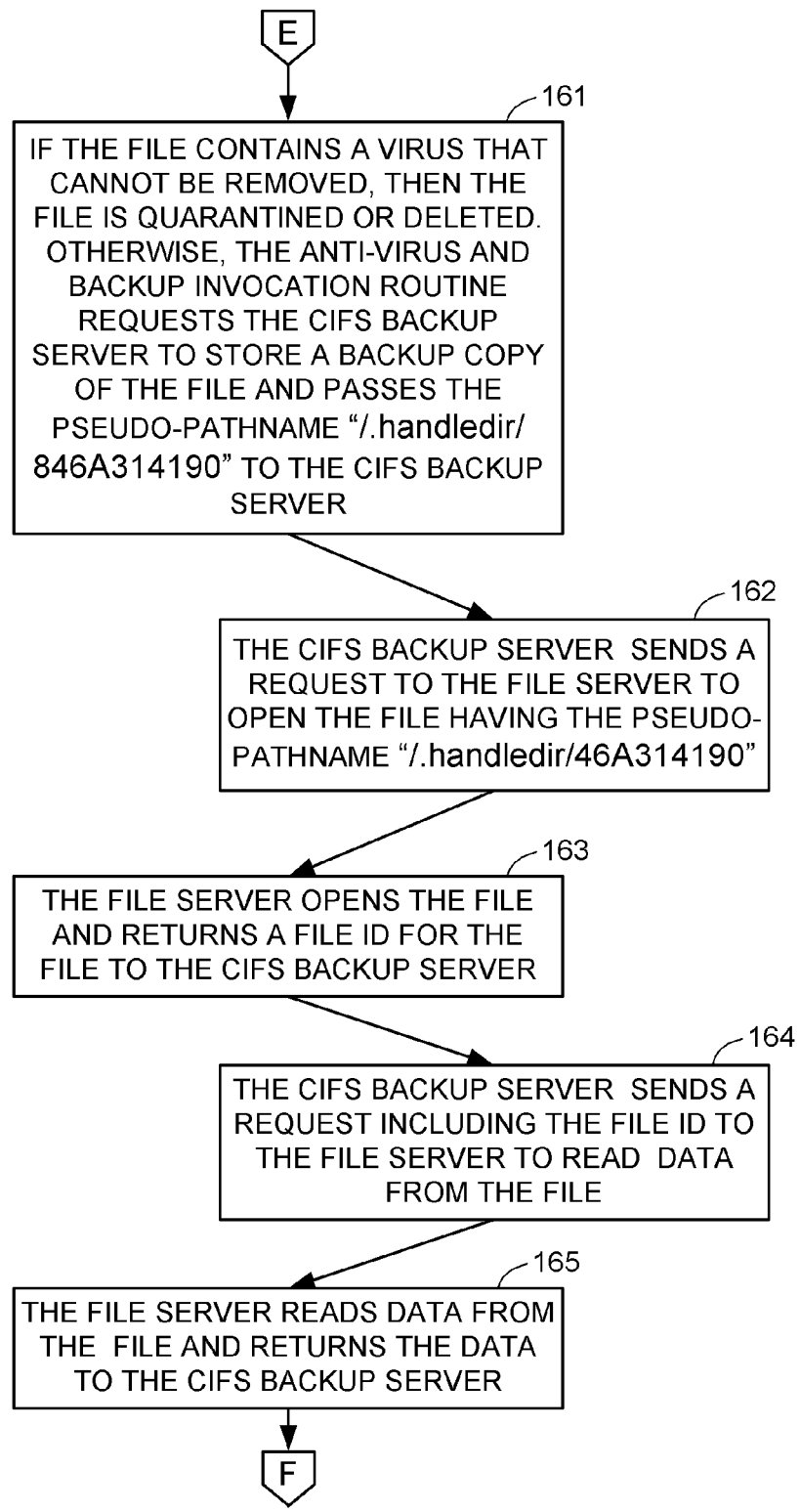

In step 161, of FIG. 10, if the file contains a virus that cannot be removed, then the file is quarantined or deleted. Otherwise, the anti-virus and backup invocation routine requests the CIFS backup server to store a backup copy of the file, and passes the pseudo-pathname "/.handledir/846A314190" to the CIFS backup server. In step 162, the CIFS backup server sends a request to the file server to open the file having the pseudo-pathname "/.handledir/846A314190". In step 163, the file server opens the file and returns a File ID for the file to the CIFS backup server. In step 164, the CIFS backup server sends a request including the File ID to the file server to read data from the file. In step 165, the file server reads data from the file and returns the data to the CIFS backup server. Execution continues from step 165 to step 171 in FIG. 11.

Figure 11:
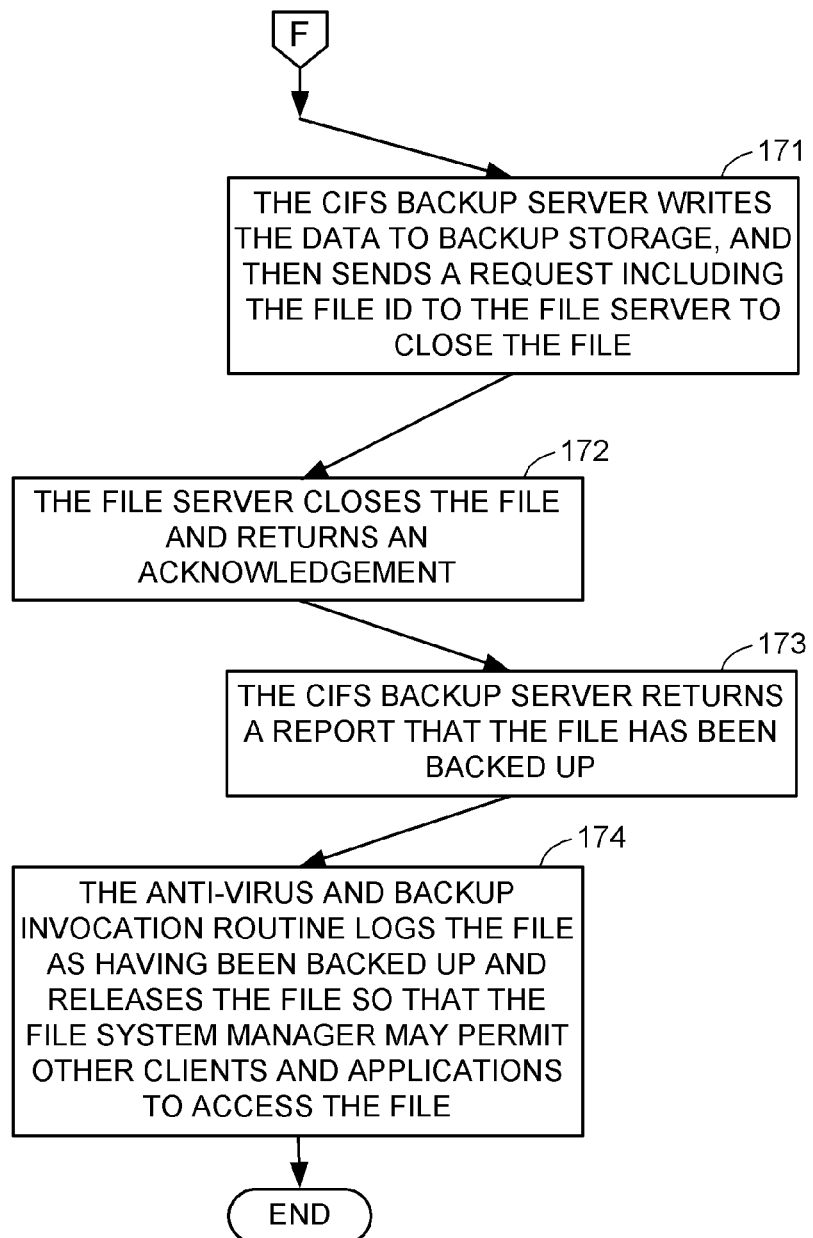

In step 171 of FIG. 11, the CIFS backup server writes the data to backup storage, and then sends a request including the File ID to the file server to close the file. In step 172, the file server closes the file and returns an acknowledgement to the CIFS backup server. In step 173, the CIFS backup server returns a report to the anti-virus and backup invocation routine that the file has been backed up. In step 174, the anti-virus and backup invocation routine logs the file as having been backed up and releases the file so that the file system manager may permit other clients and applications to access the file.

In view of the above, there has been described a method of encoding a file handle produced by a file server into a pseudo-pathname used as a substitute for a pathname in a network file access protocol for accessing a file in the file server. The method avoids repeating a directory lookup and may permit the network file access protocol to access a file that has been renamed since the file handle was produced. The method is particularly advantageous for permitting a CIFS client to access a file specified by an NFS file handle because occasionally an NFS file handle but not the pathname for the file is readily available when it is desired for a file server to report a file access error or to perform a virus scan or backup of a file that has been modified by an NFS client.

The method would also be advantageous for permitting a file transfer protocol (FTP) client to back up a file modified by a CIFS client. In this case, when the CIFS client closes the file and the file system manager of the file server recognizes that the file being closed has been modified, the file system manager invokes the anti-virus and backup invocation routine. The anti-virus and backup invocation routine obtains an NFS file handle for the file, and encodes the NFS file handle in a pseudo-pathname, and sends the pseudo-pathname to the FTP backup client. The FTP backup client sends an FTP command in the form of "RETR PATHNAME" to the file server to retrieve a copy of the file for archival storage.

The encoding of the file handle into a pseudo-pathname can be performed easily because it may involve only a numeric to alphanumeric format conversion and inclusion of a special name to distinguish the pseudo-pathname from a true pathname. The decoding of the file handle from the pseudo-pathname when using the pseudo-pathname in a file access protocol for accessing the file is also easily performed and avoids a pathname lookup in the DNLC cache, inode cache, or on-disk file system. The method also does not require decoding any information from the file handle or modifying the programming of a file server at the file access protocol layer so that it is generally applicable to various versions and specific implementations of the file access protocols. There is no need to keep or maintain a mapping database of file handles to pathnames in case of renaming or volatile file handles. The method provides a reliable way to share a file when the old pathname is no longer valid, yet the file is still accessible with the old file handle.

What is claimed is:

1. A method of accessing a file in a file server, the file server storing a file system including the file and a directory including a name of the file, the file having a pathname including the name of the directory and the name of the file in the directory, said method comprising:
   (a) the file server producing a file handle for locating the file in the file server;
   (b) encoding the file handle in a pseudo-pathname; and
   (c) a client using the pseudo-pathname as a substitute for the pathname of the file in a network file access protocol for accessing the file in the file server; and
   (d) the file server recognizing that the pseudo-pathname has been used as a substitute for the pathname of the file in the file access protocol, and upon recognizing that the pseudo-pathname has been used as a substitute for the pathname of the file in the file access protocol, the file server decoding the file handle from the pseudo-pathname and using the file handle for locating and accessing the file in the file server without searching any directory of the file system.

2. The method as claimed in claim 1, wherein the file server produces the file handle when accessing the file in accordance with the Network File System (NFS) protocol, and the client uses the pseudo-pathname as a substitute for the pathname of the file in the Common Internet File Access (CIFS) protocol.

3. The method as claimed in claim 1, wherein the pseudo-pathname includes a special name indicating that the file handle is encoded into the pseudo-pathname, and the file server decodes the file handle from the pseudo-pathname upon recognizing the special name in the file handle.

4. The method as claimed in claim 3, wherein the pseudo-pathname includes an alphanumeric string immediately following the special name, and the file handle is encoded into the alphanumeric string.

5. The method as claimed in claim 4, wherein the alphanumeric string is a hexadecimal representation of the numeric value of the file handle.

6. The method as claimed in claim 3, wherein the special name is the name of a pseudo-directory of the file system, the pseudo-directory is not contained in storage of the file server, yet an operating system of the file server successfully executes a command to set a current directory for command interpretation to the pseudo-directory so that file handles are decoded from pathnames in subsequent operating system commands.

7. The method as claimed in claim 1, wherein the file server returns the file handle in response to a client request to lookup the file in the directory given the name of the file in the directory.

8. The method as claimed in claim 1, wherein the client uses the pseudo-pathname as a substitute for the pathname of the file in the network file access protocol by including the pseudo-pathname in a request to open the file, and the file server opens the file for the client and returns a file identifier to the client in an acknowledgement that the file has been opened for the client, and the client uses the network file access protocol to read the data from the file by using the file identifier in a request to the file server for reading the data from the file.

9. The method as claimed in claim 1, which includes the file server responding to termination of access to the file by encoding the file handle to produce the pseudo-pathname, and sending a service request including the pseudo-pathname to the client.

10. The method as claimed in claim 1, which includes the file server responding to modification of data of the file by encoding the file handle to produce the pseudo-pathname, and sending a virus scan request including the pseudo-pathname to the client.

11. The method as claimed in claim 1, which includes the file server responding to modification of data of the file by encoding the file handle to produce the pseudo-pathname, and sending a file backup request including the pseudo-pathname to the client.

12. A method of sharing access to a file of a file system between a first client and a second client, the file system being stored in a file server providing service to the first client and the second client, said method comprising:
   (a) the first client using the Network File Access (NFS) protocol to send to the file server a directory lookup request to locate a file specified by a name of the file, and the file server responding by locating the file and returning an NFS file handle to the first client, and the first client using the NFS protocol to send to the file server a write request including the NFS file handle to write data to the file, and the file server responding by writing the data to the file; and
   (b) the second client using the Common Internet File System (CIFS) protocol to send to the file server a request to open the file, the request to open the file including a pseudo-pathname specifying the file, the pseudo-pathname being used as a substitute for a pathname of the file in the CIFS protocol, and the file server decoding the NFS file handle from the pseudo-pathname and using the NFS file handle for locating and opening the file, and the file server returning to the second client a File ID, and the second client using the CIFS protocol to send to the file server a read request including the File ID to read the data from the file, and the file server responding by reading the data from the file and returning the data read from the file to the second network client.

13. The method as claimed in claim 12, wherein the pseudo-pathname includes a special name followed by an alphanumeric string encoding the NFS file handle, and wherein the method includes the file server responding to the second request to open the file by recognizing the special name in the pseudo-pathname and in response decoding the NFS file handle from the alphanumeric string.

14. The method as claimed in claim 12, which further includes the file server producing the pseudo-pathname by encoding the NFS file handle, and after writing the data to the file, sending a request including the pseudo-pathname to the second client for an anti-virus scan of the file.

15. A file server comprising:
   data storage for storing a file system;
   at least one data processor coupled to the data storage for accessing the file system in the data storage; and
   a network interface coupled to said at least one data processor for data communication between network clients and said least one data processor;
   wherein said at least one data processor is programmed for providing the network clients with access to the file system using the Network File System (NFS) protocol and the Common Internet File System (CIFS) protocol,
   wherein said at least one data processor is programmed for providing a first network client with access to the file system using the NFS protocol for receiving from the first network client a name of the file and in response providing to the first network client an NFS file handle identifying the file in the file server, and for receiving from the first network client a request including the file handle for writing data to the file and in response writing the data to the file; and
   wherein said at least one data processor is further programmed for providing a second network client with access to the file system using the CIFS protocol for receiving from the second network client a pseudo-pathname specifying the file, wherein the NFS file handle is encoded in the pseudo-pathname and the pseudo-pathname is used as a substitute for a pathname of the file in the CIFS protocol, and
   wherein said at least one data processor is programmed to recognize that the pseudo-pathname has been used in the CIFS protocol as a substitute for the pathname and upon recognizing that the pseudo-pathname has been used in the CIFS protocol as a substitute for the pathname then decoding the NFS file handle from the pseudo-pathname and using the NFS file handle for accessing the file to enable the second client to read the data from the file.

16. The file server as claimed in claim 15, wherein the decoding of the NFS file handle from the pseudo-pathname enables said at least one data processor to locate and access the file without searching any directory of the file system.

17. The file server as claimed in claim 15, wherein the pseudo-pathname includes a special name followed by an alphanumeric string encoding the NFS file handle, and said at least one data processor is programmed for recognizing the special name in the pseudo-pathname and in response decoding the NFS file handle from the alphanumeric string.

18. The file server as claimed in claim 15, wherein the pseudo-pathname includes a special name, said at least one data processor is programmed for recognizing the special name for recognizing that the pseudo-pathname has been substituted for the pathname in the CIFS protocol, and the special name is the name of a pseudo-directory of the file system, the pseudo-directory is not contained in the data storage of the file server, yet said at least one data processor is programmed with an operating system for successfully executing a command to set a current directory for command interpretation to the pseudo-directory so that NFS file handles are decoded from pathnames in subsequent operating system commands.

19. The file server as claimed in claim 15, wherein said at least one data processor is further programmed for responding to termination of access of the first client to the file by encoding the NFS file handle to produce the pseudo-pathname, and sending a service request including the pseudo-pathname to the second network client.

20. The file server as claimed in claim 15, wherein said at least one data processor is programmed for responding to modification of data of the file by producing the pseudo-pathname by encoding the NFS file handle, and sending a request including the pseudo-pathname to the second network client for an anti-virus scan of the file.

\* \* \* \* \*